(12) United States Patent
Squarcini et al.

(10) Patent No.: US 10,024,322 B2
(45) Date of Patent: *Jul. 17, 2018

(54) MECHANICAL COMBUSTION-ENGINE-DRIVEN FLUID PUMP WITH A MAGNETO-RHEOLOGICAL MULTI-DISK CLUTCH

(75) Inventors: Raffaele Squarcini, Leghorn (IT); Elisa Bartalesi, San Gimignano (IT); Giacomo Armenio, Leghorn (IT); Francesco Bucchi, Pisa (IT); Rocco Rizzo, Pisa (IT); Antonio Musolino, Pisa (IT); Paola Forte, Pisa (IT); Francesco Frendo, Viareggio (IT); Alessandro Franceschini, Capannori Lucca (IT)

(73) Assignee: PIERBURG PUMP TECHNOLOGY GMBH, Neuss (DE)

(*) Notice: Subject to any disclaimer, the term of this patent is extended or adjusted under 35 U.S.C. 154(b) by 524 days.

This patent is subject to a terminal disclaimer.

(21) Appl. No.: 14/422,703

(22) PCT Filed: Aug. 23, 2012

(86) PCT No.: PCT/EP2012/066465
§ 371 (c)(1),
(2), (4) Date: May 28, 2015

(87) PCT Pub. No.: WO2014/029446
PCT Pub. Date: Feb. 27, 2014

(65) Prior Publication Data
US 2015/0308432 A1    Oct. 29, 2015

(51) Int. Cl.
*F04D 13/02* (2006.01)
*F16D 37/02* (2006.01)
(Continued)

(52) U.S. Cl.
CPC ............ *F04D 13/02* (2013.01); *F04D 1/00* (2013.01); *F16D 37/02* (2013.01); *F16D 2037/004* (2013.01)

(58) Field of Classification Search
CPC ...... F04D 13/02; F04D 13/021; F04D 13/022; F04D 1/00; F04D 25/022; F16D 37/02; (Continued)

(56) References Cited

U.S. PATENT DOCUMENTS

| 2,575,360 A | 11/1951 | Rabinow |
| 2,845,157 A | 7/1958 | Gambell |

(Continued)

FOREIGN PATENT DOCUMENTS

| CN | 101233338 A | 7/2008 |
| CN | 101915277 A | 12/2010 |

(Continued)

*Primary Examiner* — Essama Omgba
*Assistant Examiner* — Stephen Mick
(74) *Attorney, Agent, or Firm* — Norman B. Thot

(57) ABSTRACT

A fluid pump includes an input shaft, a pumping unit comprising a pump rotor, and a clutch arranged between the input shaft and the pump rotor. The clutch comprises at least two input clutch disks, at least two output clutch disks, a permanent magnet element, and an actuator. The at least two input clutch disks and the at least two output clutch discs together define at least two clutch liquid gaps which are filled with a magneto-rheological clutch liquid. The permanent magnet element shifts between an engaged position wherein a magnetic field of the permanent magnet element penetrates the at least two clutch liquid gaps with a high magnetic flux, and a disengaged position wherein the magnetic field of the permanent magnet element is less than in the engaged position. The actuator moves the permanent magnet element between the engaged position and the disengaged position.

9 Claims, 2 Drawing Sheets

(51) Int. Cl.
*F04D 1/00* (2006.01)
*F16D 37/00* (2006.01)

(58) Field of Classification Search
CPC .. F16D 2037/004; F04B 17/05; F04B 35/002; F04C 15/0061; F04C 29/005
USPC ........................................ 417/223, 316, 319
See application file for complete search history.

(56) References Cited

U.S. PATENT DOCUMENTS

| | | | | |
|---|---|---|---|---|
| 3,841,449 | A | * | 10/1974 | Coffey ................ F16D 25/088 192/3.59 |
| 5,823,309 | A | * | 10/1998 | Gopalswamy .......... F16D 37/02 192/113.31 |
| 5,848,678 | A | | 12/1998 | Johnston et al. |
| 5,906,480 | A | | 5/1999 | Sabelström et al. |
| 5,967,273 | A | * | 10/1999 | Hampton .............. F16D 37/008 192/21.5 |
| 7,422,093 | B2 | | 9/2008 | Murty et al. |
| 7,954,612 | B2 | * | 6/2011 | Mogami ................ F16D 13/04 192/110 B |
| 8,016,092 | B2 | | 9/2011 | McDaniel |
| 2002/0096132 | A1 | | 7/2002 | Stretch et al. |
| 2007/0022979 | A1 | | 2/2007 | Gradu et al. |
| 2008/0135367 | A1 | | 6/2008 | Steinwender |
| 2009/0022606 | A1 | | 1/2009 | Togawa et al. |
| 2009/0266666 | A1 | | 10/2009 | McDaniel |
| 2012/0090938 | A1 | | 4/2012 | Maas et al. |
| 2013/0270056 | A1 | * | 10/2013 | Mankame ............... F16D 23/12 192/84.5 |
| 2017/0089408 | A1 | * | 3/2017 | Berthelemy ............ F16D 29/00 |

FOREIGN PATENT DOCUMENTS

| | | |
|---|---|---|
| CN | 102341609 A | 2/2012 |
| DE | 10 2007 020 867 A1 | 11/2008 |
| EP | 0 553 010 A1 | 7/1993 |
| EP | 1 225 361 A1 | 7/2002 |
| FR | 1.101.667 A | 10/1955 |
| GB | 708557 | 5/1954 |
| GB | 751382 A | 6/1956 |
| GB | 2 211 572 A | 7/1989 |
| JP | 57-152472 A | 9/1982 |
| JP | 61-248924 A | 11/1986 |
| JP | 5-58190 A | 3/1993 |
| JP | 5-252800 A | 9/1993 |
| JP | 6-294425 A | 10/1994 |
| JP | 8-72700 A | 3/1996 |
| JP | 8-277853 A | 10/1996 |
| JP | 9-509119 A | 9/1997 |
| JP | 11-201193 A | 7/1999 |
| JP | 2011-182574 A | 9/2011 |

\* cited by examiner

MECHANICAL COMBUSTION-ENGINE-DRIVEN FLUID PUMP WITH A MAGNETO-RHEOLOGICAL MULTI-DISK CLUTCH

CROSS REFERENCE TO PRIOR APPLICATIONS

This application is a U.S. National Phase application under 35 U.S.C. § 371 of International Application No. PCT/EP2012/066465, filed on Aug. 23, 2012. The International Application was published in English on Feb. 27, 2014 as WO 2014/029446 A1 under PCT Article 21(2).

FIELD

The present invention relates to a mechanical fluid pump which is driven by an internal combustion engine and which provides a liquid, a pressurized gas, or a vacuum to an automotive unit.

BACKGROUND

The fluid pump can be a lubricant pump, a coolant pump, a vacuum pump, or a pump providing pressurized liquid or gas, for example, pressurized air. The mechanical fluid pump is not driven by an electric motor, but is directly connected to the combustion engine. The rotational speed of the fluid pump is therefore proportional to the rotational speed of the combustion engine so that the fluid pump always rotates even if no need exists for a fluid supply or for a suction activity to create a vacuum.

U.S. Pat. No. 7,422,093 B2 describes a fluid pump for providing a pressurized liquid for a hydraulic power steering. The fluid pump is provided with a magneto-rheological clutch so that the pump performance can be controlled depending on the fluid demand and pressure demand of the power steering.

A risk of failure is not acceptable for vital fluid pumps, such as a lubricant pump, a coolant pump, or a vacuum pump for a pneumatic brake assistance unit. The fluid pump including the clutch should be as compact as possible. A relatively high torque must be coupled by the clutch in many applications.

SUMMARY

An aspect of the present invention is to provide a mechanical combustion-engine-driven fluid pump with a compact magneto-rheological clutch.

In an embodiment, the present invention provides a mechanical combustion-engine-driven fluid pump which includes an input shaft configured to be directly driven by a combustion engine, a pumping unit comprising a pump rotor, and a magneto-rheological multi-disk clutch arranged between the input shaft and the pump rotor. The magneto-rheological multi-disk clutch comprises at least two radial input clutch disks, at least two radial output clutch disks, a permanent magnet element, and an actuator. The at least two radial input clutch disks and the at least two radial output clutch discs together define at least two radial clutch liquid gaps arranged between the at least two radial input clutch disks and the at least two radial output clutch discs. The at least two radial clutch liquid gaps are filled with a magneto-rheological clutch liquid. The permanent magnet element is configured to be shiftable between an engaged position wherein a magnetic field of the permanent magnet element penetrates the at least two radial clutch liquid gaps with a high magnetic flux, and a disengaged position wherein the magnetic field of the permanent magnet element is less than in the engaged position. The actuator is configured to move the permanent magnet element between the engaged position and the disengaged position.

BRIEF DESCRIPTION OF THE DRAWINGS

The present invention is described in greater detail below on the basis of embodiments and of the drawings in which.

DETAILED DESCRIPTION

Figure 1:
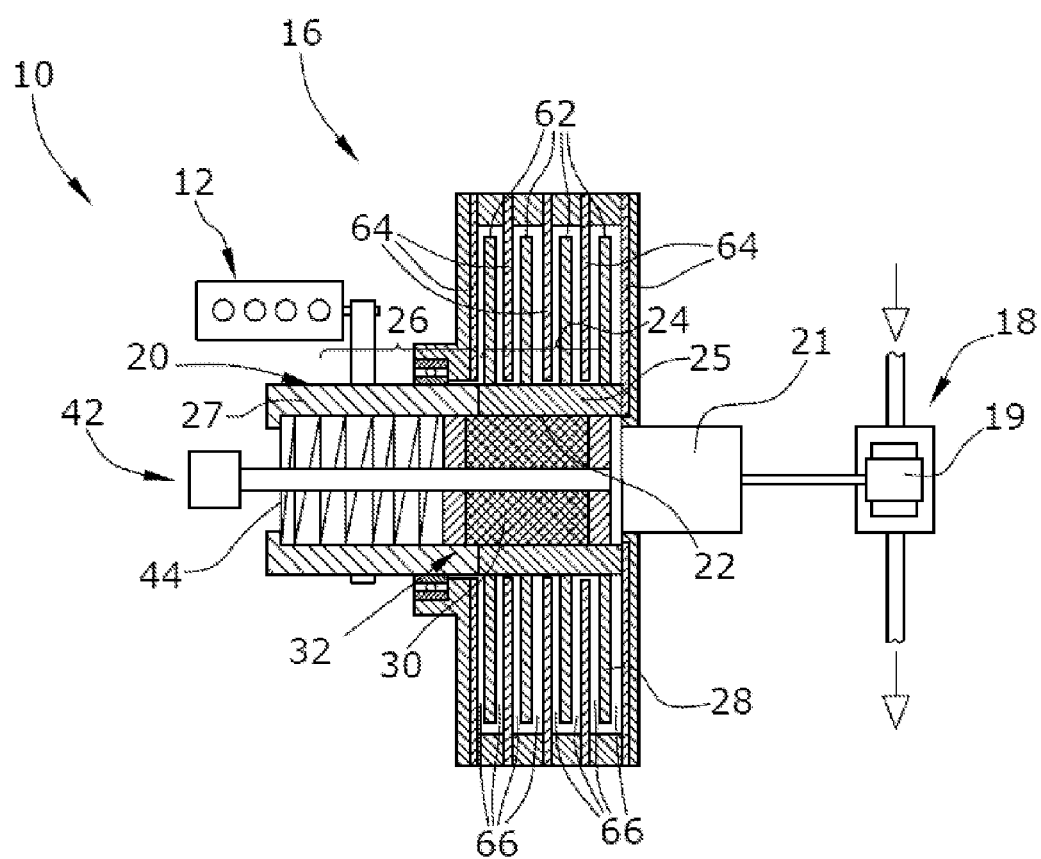
FIG. 1 shows a mechanical combustion-engine-driven fluid pump with a magneto-rheological multi-disc clutch in longitudinal cross-section in the engaged state.

The fluid pump according to the present invention is provided with an input shaft which is directly driven by the combustion engine, and with a pumping unit with a pump rotor for pumping the fluid which can be a liquid or a gas. The term "directly driven" as used herein means that no disengagable clutch exists between the rotational element of the engine and the input shaft of the pump. The input shaft of the pump can be driven by the engine via a belt, gear wheels, or by a direct coupling with the camshaft or the crankshaft of the engine.

The clutch is realized as a magneto-rheological clutch in the form of a multi-disc clutch. The clutch is provided with at least two radial input clutch disks and at least two radial output clutch disks, whereby the clutch disks define numerous radial clutch liquid gaps between them. The multi-disk configuration of the magneto-rheological clutch allows for a compact diameter of the clutch and for the transfer of high torques from the clutch input to the clutch output.

The radial clutch liquid gaps arranged axially between the input clutch disks and the output clutch disks are filled with a magneto-rheological clutch liquid which has a relatively high viscosity when a magnetic field is present and which has a relatively low viscosity when no magnetic field is present. The term "liquid" when used in context with the magneto-rheological liquid is not to be taken literally, but is to be understood as a kind of a magneto-rheological fluid which can also somehow be solid when activated by a magnetic field. The magnetic field for increasing the viscosity of the magneto-rheological clutch liquid is not generated by an electromagnetic means, but is generated by a permanent magnet element which is shiftable between a disengaged position in which the permanent magnet element's magnetic field penetration flux in the clutch liquid gaps is low, and an engaged position in which the magnetic field flux penetration in the clutch liquid gaps is high. In its engaged position, the permanent magnet is positioned close to the clutch liquid gaps, and in the disengaged position, the permanent magnet is more distant and remote from the clutch liquid gaps. The permanent magnet element can be provided so as to co-rotate with the input clutch disks so that the permanent magnet element always rotates with the rotational speed of the input shaft.

The permanent magnet element is moved between the engaged and the disengaged position by a separate magnet element actuator.

Since the magnetic field for penetrating the clutch liquid gaps and the magneto-rheological clutch liquid therein is not generated by an electromagnet, the magneto-rheological clutch can generally also be engaged if the control means of the pump and for the clutch actuation fails.

The magneto-rheological eddy-current clutch can also generally be combined with other automotive devices around or not around the engine, or even outside automotive applications.

In an embodiment of the present invention, the permanent magnet element can, for example, be provided so as to be shiftable in an axial direction. The permanent magnet element can, for example, be magnetized in a circumferential direction.

In an embodiment of the present invention, the permanent magnet element can, for example, be pretensioned by a passive pretension element into its engaged position. If the actuator fails, the pretension element pushes the permanent magnet element into the engaged position. This arrangement makes the clutch concept failsafe. The passive pretension element can, for example, be a spring or another permanent magnet. The passive pretension element does not, however, need any external energy to provide the pretension force.

In an embodiment of the present invention, the magnet chamber can, for example, be provided radially inwardly of the clutch disks. The permanent magnet element is provided so as to be shiftable in the magnet chamber between the engaged and the disengaged position. The clutch disks are arranged radially outwardly and radially adjacent to the magnet chamber. The radial planes of the clutch liquid gaps intersect with the permanent magnet element in its engaged position. In other words, the magnetic field of the engaged permanent magnet element penetrates the fluid liquid gaps generally radially. This arrangement allows for a homogenous penetration of the radial fluid liquid gaps when the permanent magnet element is in its engaged position.

The magnet chamber is the chamber wherein the permanent magnet element is arranged so as to be shiftable between its engaged and disengaged position. In an embodiment, a longitudinal engagement section of the magnet chamber wall intersecting with the planes of the clutch liquid gaps can, for example, be made out of a non-ferromagnetic material. The magnetic field of the permanent magnet element is therefore radially not shielded in the engagement section of the magnet chamber wall so that the magnetic field of the permanent magnet element penetrates the clutch liquid gaps without any relevant weakening. The radial thickness of the magnet chamber wall in the engagement section should be as small as possible to minimize the magnetic gap between the permanent magnet element and the clutch liquid gaps.

In an embodiment of the present invention, the longitudinal disengagement section of the magnet chamber wall can, for example, be made of a ferromagnetic material to shield the magnetic field of the permanent magnet element with respect to the clutch liquid gaps in the disengaged position of the permanent magnet element. The better the magnetic shielding of the permanent magnet in its disengaged position is, the less torque is transferred between the input clutch disks and the output clutch disks in the disengaged position of the permanent magnet element.

In an embodiment of the present invention, the actuator can, for example, be provided as a vacuum actuator. The vacuum actuator is magnetically neutral and does not generate any electromagnetic field which could penetrate the clutch liquid gap filled with the magneto-rheological clutch liquid.

An embodiment of the present invention is described below under reference to the drawings.

Figure 2:
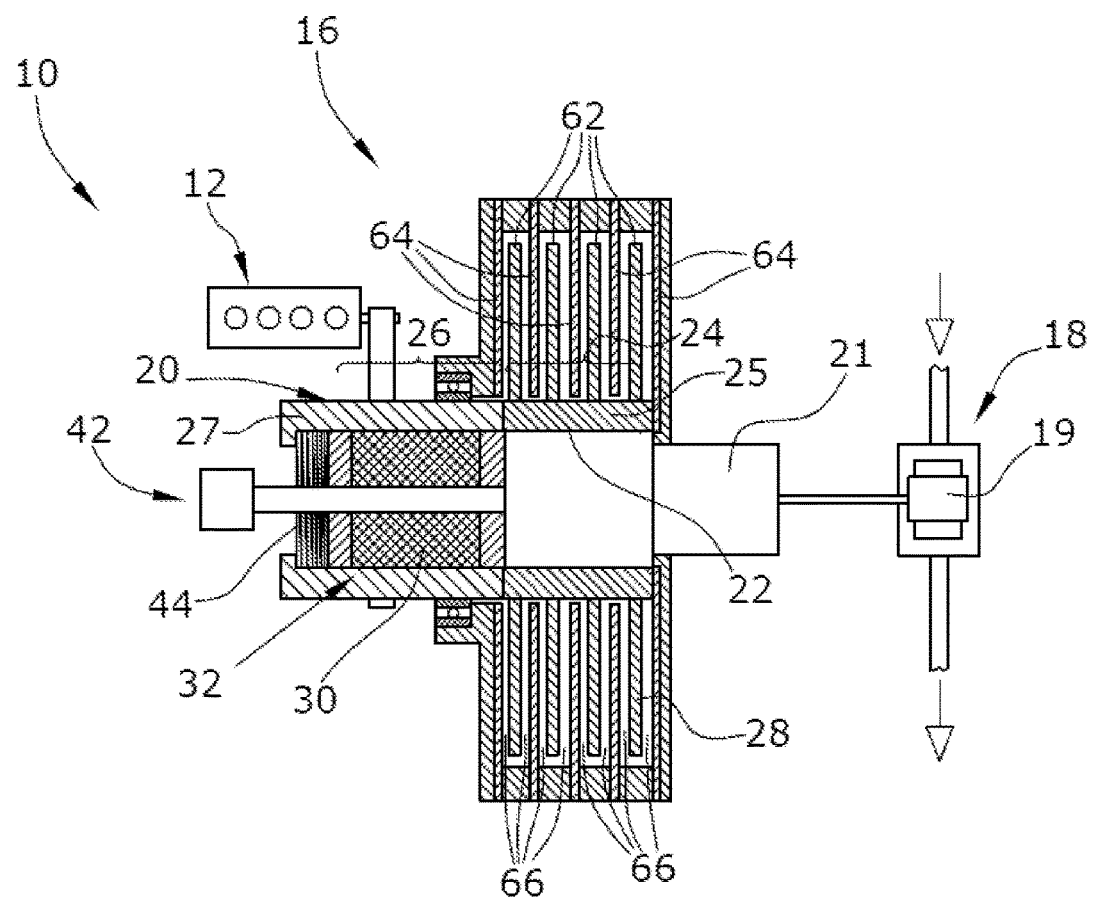
FIG. 2 shows the fluid pump of FIG. 1 in the disengaged state.

FIGS. 1 and 2 show a typical automotive arrangement consisting of an internal combustion engine 12 and a mechanical fluid pump 10 directly driven by the internal combustion engine 12. The fluid pump 10 can be designed as a vacuum pump 10, but also can be provided as a lubricant pump, coolant pump etc. The internal combustion engine 12 is mechanically connected directly to an input shaft 20 of a clutch 16 of the vacuum pump 10 so that the input shaft 20 always co-rotates with a rotational speed directly proportional to the rotational speed of the internal combustion engine 12.

The clutch 16 is arranged between the input shaft 20 and an output shaft 21 and is designed as a magneto-rheological multi-disc clutch 16. The clutch 16 connects the input shaft 20 with the output shaft 21 in the engaged clutch state, as shown in FIG. 1, and disconnects the output shaft 21 from the input shaft 20 in the disengaged state, as shown in FIG. 2. The output shaft 21 of the clutch 16 is directly coupled to a vacuum pumping unit 18 with a pump rotor 19. The clutch 16 is provided with four radially input clutch disks 62 and with five radial output clutch disks 64. All clutch disks 62, 64 lie in a radial plane, respectively. Between the clutch disks 62, 64, eight radial clutch liquid gaps 66 are defined which are filled with a magneto-rheological clutch liquid 28. The magneto-rheological clutch liquid 28 cannot disappear because the clutch liquid gaps 66 are hermetically closed.

A permanent magnet element 32 is positioned radially inside and in the center of the clutch disks 62, 64. The permanent magnet element 32 can be provided as a cylindrical magnet body 30 being provided so as to be axially shiftable within a cylindrical magnet chamber 22. The magnet chamber 22 is provided and defined by cylindrical chamber walls 25, 27 defining a engagement section 24 intersecting with the radial planes of the clutch disks 62, 64, the clutch liquid gaps 66, and a disengagement section 26 not intersecting with the radial planes of the clutch disks 62, 64 and the clutch liquid gaps 66. The chamber wall 25 of the engagement section 24 is made out of a non-ferromagnetic material, such as for example aluminum or plastic. The chamber wall 27 of the disengagement section 26 is made out of a ferromagnetic material to shield the magnetic field of the permanent magnet element 32 with respect to the clutch liquid gaps 66 in the disengaged position of the permanent magnet element 32, as shown in FIG. 2.

In engaged position, the permanent magnet element 32 is close to the radial clutch liquid gaps 66 containing the magneto-rheological clutch liquid 28 therein so that the magnetic field generated by the permanent magnet element 32 penetrates the magneto-rheological clutch liquid 28 inside the clutch liquid gaps 66 with a maximum magnetic flux.

The permanent magnet element 32 is pretensioned by a pretension element 44 into its engaged position, as shown in FIG. 1. This arrangement makes the clutch 16 failsafe because the permanent magnet element 32 is always pushed into its engaged position if the pneumatic actuator 42 should fail.

As long as the clutch 16 remains disengaged by activation of the pneumatic actuator 42, the permanent magnet element 32 is pulled into and held in its disengaged position, as shown in FIG. 2. In the disengaged position of the permanent magnet element 32, the magnetic field is remote and shielded with respect to the clutch liquid gaps 66 so that the magnetic flux in the clutch liquid gaps 66 is relatively low with the result that the viscosity of the magneto-rheological clutch liquid is relatively low. The clutch is disengaged.

As soon as the clutch 16 is switched into the engaged state by deactivating the pneumatic actuator 42, the pneumatic magnet element 32 is pushed into its engaged position by the pretension element 44, as shown in FIG. 1. In this state, the magnetic field flux penetrating the clutch liquid gap 66 is relatively high so that the viscosity of the magneto-rheological clutch liquid is relatively high. In this engaged state, the output shaft 21 rotates with the same rotational speed as the input shaft 20. The output shaft 21 drives the pump rotor 19 of the vacuum pumping unit 18 so that the vacuum pumping unit 18 is pumping the fluid.

The present invention is not limited to embodiments described herein; reference should be had to the appended claims.

What is claimed is:

1. A mechanical combustion-engine-driven fluid pump comprising:
   an input shaft configured to be directly driven by a combustion engine;
   a pumping unit comprising a pump rotor; and
   a magneto-rheological multi-disk clutch arranged between the input shaft and the pump rotor, the magneto-rheological multi-disk clutch comprising,
   at least two radial input clutch disks,
   at least two radial output clutch disks, the at least two radial input clutch disks and the at least two radial output clutch discs together defining at least two radial clutch liquid gaps arranged between the at least two radial input clutch disks and the at least two radial output clutch discs, the at least two radial clutch liquid gaps being filled with a magneto-rheological clutch liquid,
   a permanent magnet element configured to be shiftable between an engaged position wherein a magnetic field of the permanent magnet element penetrates the at least two radial clutch liquid gaps with a high magnetic flux, and a disengaged position wherein the magnetic field of the permanent magnet element is less than in the engaged position,
   an actuator configured to move the permanent magnet element between the engaged position and the disengaged position, and
   a magnet chamber arranged radially inwardly of the at least two radial input clutch disks and the at least two radial output clutch discs, wherein the permanent magnet element is arranged in the magnet chamber so as to move between the engaged position and the disengaged position,
   wherein,
   the permanent magnet element is arranged so as to be shiftable in an axial direction,
   the magnet chamber comprises a first magnet chamber wall which comprises a longitudinal engagement section made of a non-ferromagnetic material, the longitudinal engagement section being configured to intersect with the radial planes of the at least two radial clutch liquid gaps, and
   magnet chamber comprises a second magnet chamber wall which comprises a longitudinal disengagement section made of a ferromagnetic material so as to shield the magnetic field of the permanent magnet element with respect to the at least two radial clutch liquid gaps in the disengaged position of the permanent magnet element.

2. The mechanical combustion-engine-driven fluid pump as recited in claim 1, further comprising a passive pretension element configured to pretension the permanent magnet element into the engaged position.

3. The mechanical combustion-engine-driven fluid pump as recited in claim 1, wherein the at least two radial clutch liquid gaps comprise radial planes which intersect with the permanent magnet element in the engaged position.

4. The mechanical combustion-engine-driven fluid pump as recited in claim 1, wherein the actuator is a vacuum actuator.

5. A mechanical combustion-engine-driven fluid pump comprising:
   an input shaft configured to be directly driven by a combustion engine;
   a pumping unit comprising a pump rotor; and
   a magneto-rheological multi-disk clutch arranged between the input shaft and the pump rotor, the magneto-rheological multi-disk clutch comprising,
   at least two radial input clutch disks,
   at least two radial output clutch disks, the at least two radial input clutch disks and the at least two radial output clutch discs together defining at least two radial clutch liquid gaps arranged between the at least two radial input clutch disks and the at least two radial output clutch discs, the at least two radial clutch liquid gaps being filled with a magneto-rheological clutch liquid,
   a permanent magnet element configured to be shiftable between an engaged position wherein a magnetic field of the permanent magnet element penetrates the at least two radial clutch liquid gaps with a high magnetic flux, and a disengaged position wherein the magnetic field of the permanent magnet element is less than in the engaged position,
   an actuator configured to move the permanent magnet element between the engaged position and the disengaged position, and
   a magnet chamber arranged radially inwardly of the at least two radial input clutch disks and the at least two radial output clutch discs, wherein the permanent magnet element is arranged in the magnet chamber so as to move between the engaged position and the disengaged position,
   wherein,
   the permanent magnet element is arranged so as to be shiftable in an axial direction, and
   the at least two radial clutch liquid gaps comprise radial planes which intersect with the permanent magnet element in the engaged position.

6. The mechanical combustion-engine-driven fluid pump as recited in claim 5, further comprising a passive pretension element configured to pretension the permanent magnet element into the engaged position.

7. The mechanical combustion-engine-driven fluid pump as recited in claim 5, wherein the magnet chamber comprises a first magnet chamber wall which comprises a longitudinal engagement section made of a non-ferromagnetic material, the longitudinal engagement section being configured to intersect with the radial planes of the at least two radial clutch liquid gaps.

8. The mechanical combustion-engine-driven fluid pump as recited in claim 5, wherein the magnet chamber comprises a second magnet chamber wall which comprises a longitudinal disengagement section made of a ferromagnetic material so as to shield the magnetic field of the permanent magnet element with respect to the at least two radial clutch liquid gaps in the disengaged position of the permanent magnet element.

9. The mechanical combustion-engine-driven fluid pump as recited in claim 5, wherein the actuator is a vacuum actuator.

\* \* \* \* \*